Figure 1:
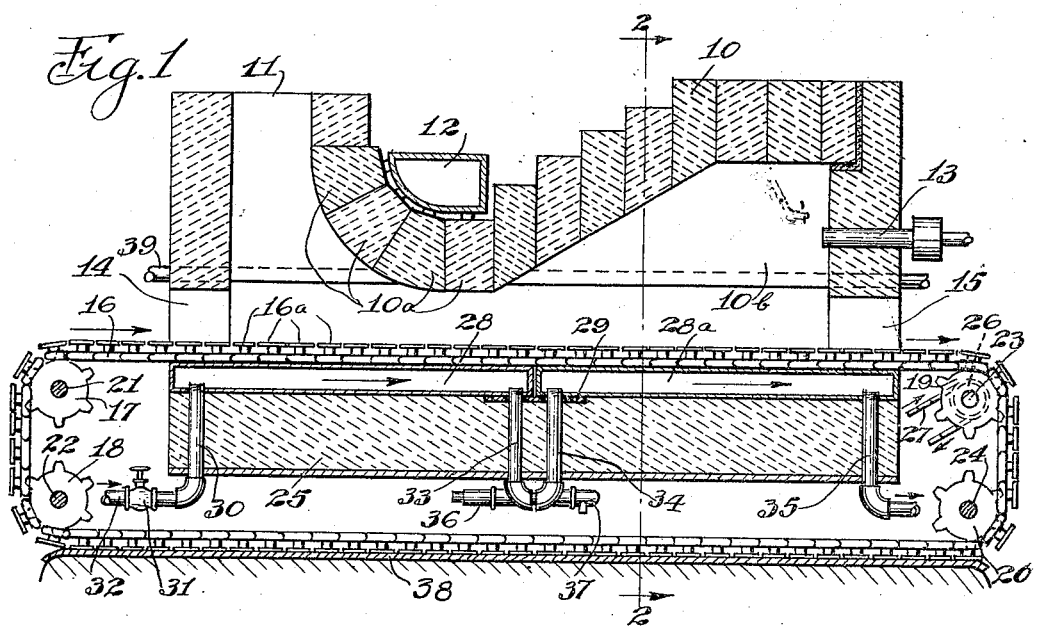

Sept. 20, 1932.    E. O. SESSIONS    1,878,896
FURNACE FOR EFFECTING HEAT TREATMENTS
Filed May 23, 1930    3 Sheets-Sheet 1

INVENTOR.
EDSON O. SESSIONS
BY Albert E. Bell
ATTORNEY.

Sept. 20, 1932.   E. O. SESSIONS   1,878,896
FURNACE FOR EFFECTING HEAT TREATMENTS
Filed May 23, 1930   3 Sheets-Sheet 2

INVENTOR.
EDSON O. SESSIONS
BY Albert C. Bell
ATTORNEY.

Sept. 20, 1932.　　　E. O. SESSIONS　　　1,878,896

FURNACE FOR EFFECTING HEAT TREATMENTS

Filed May 23, 1930　　　3 Sheets-Sheet 3

INVENTOR.
EDSON O. SESSIONS
BY Albert C. Bell
ATTORNEY.

Patented Sept. 20, 1932

1,878,896

UNITED STATES PATENT OFFICE

EDSON O. SESSIONS, OF CHICAGO, ILLINOIS

FURNACE FOR EFFECTING HEAT TREATMENTS

Application filed May 23, 1930. Serial No. 454,968.

My invention relates to an improved construction of furnace for heat treating desired metal parts and materials, by which the conveying mechanism used with the furnace may be protected from the action of the heat of the furnace, particularly where high temperatures are required in the furnace.

In furnaces used for heat treatment, various ranges of temperature are required, depending upon the nature of the treatment to be given the parts or material passed through the furnace. For example, where the treatment consists of nitriding, malleabilizing, hardening, drawing or normalizing, the temperature may range from 1200° F. to 1600° F.; again, where the treatment consists of annealing, carborizing, or soaking, the temperature may range from 1600° F. to 1900° F.; again, where the treatment is for the purpose of heating bars, slabs, or billets, heating parts for forging, and for reheating parts, the temperature may be as high as 2800° F. in the furnace. In furnaces of the kind referred to, metal conveyer chains are usually employed to move the material or parts to be treated, through the furnace, the furnace being constructed in any case to produce the required heat and subject the parts to the necessary temperature for the time interval required to effect the treatment desired.

While the conveyor chains employed may be made of iron or steel for the lower temperatures of treatment referred to, considerable difficulty is experienced where the higher temperatures referred to are required, in selecting material for the conveyor chains, that will even to a reasonable degree withstand the high temperature of the furnace, even though the best heat resistant iron or steel alloys available are used, for example ferroalloy, or other alloy having a much higher melting or disintegrating temperature than that of iron or steel itself.

By my present invention I provide an improved construction of runways for the conveyor chains, and an improved construction of chain for cooperation with the runways, by which cooling fluid may be circulated through the runways, and bearing surfaces of substantial extent are provided on the chain links for effectively communicating the heat of the chain links to the runways, these bearing surfaces also on account of their large surfaces, materially reducing the wear of the chains upon the runways. By my invention I also provide controlling mechanism for regulating the flow of the cooling fluid through the runways according to the temperatures of the runways and the need there may be from time to time to cool them.

Figure 2:
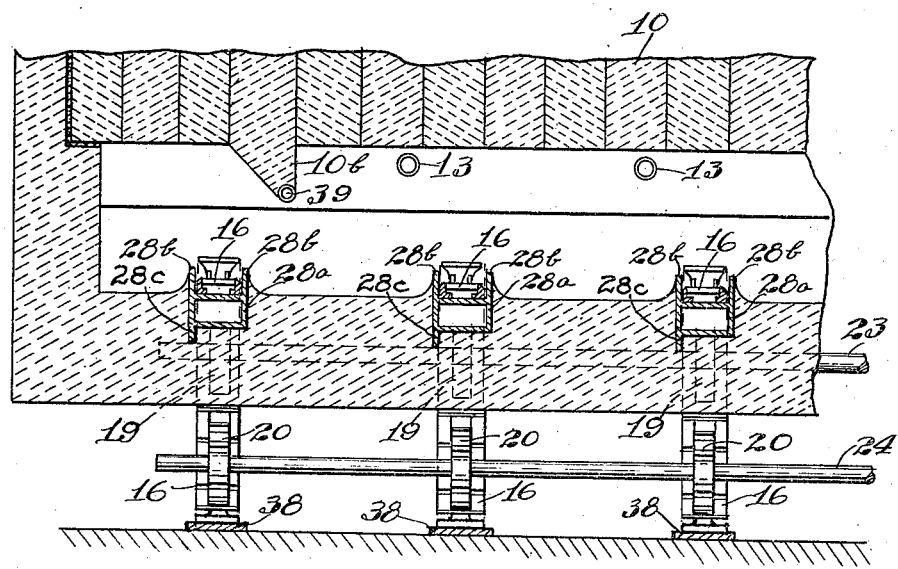
Figure 3:
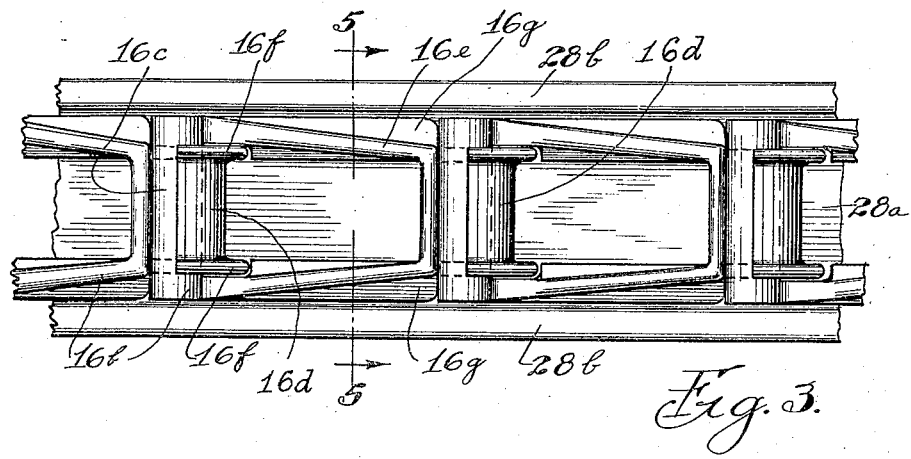
Figure 4:
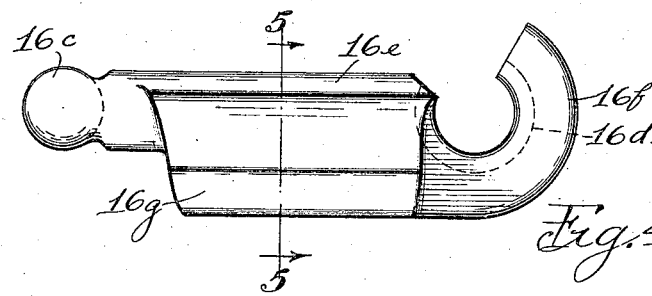
Figure 5:
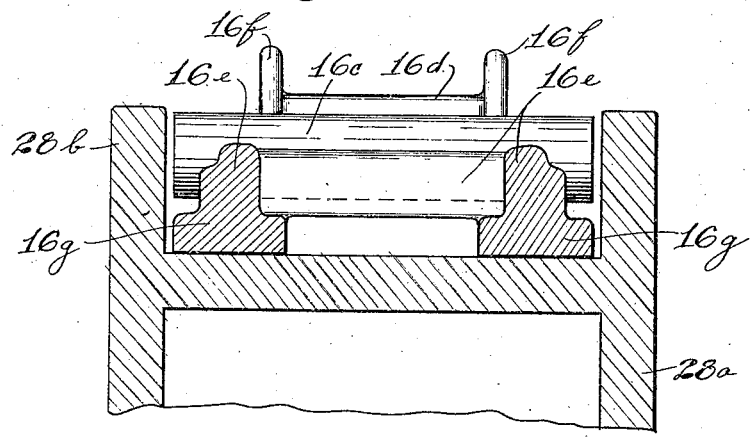
Figure 6:
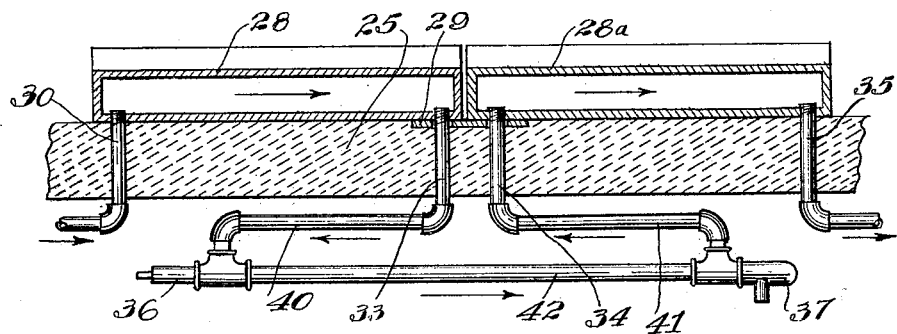
Figure 7:
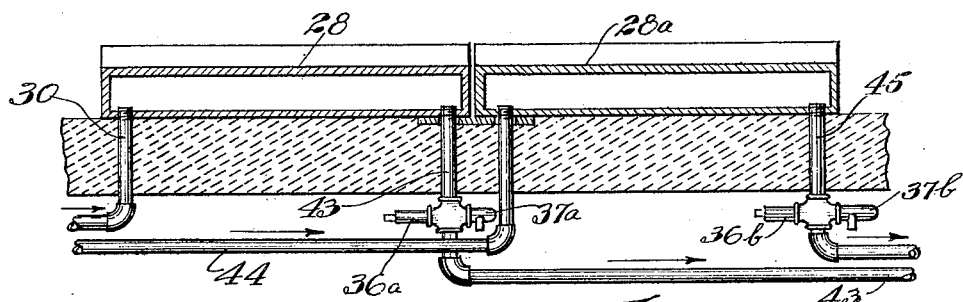
Figure 8:
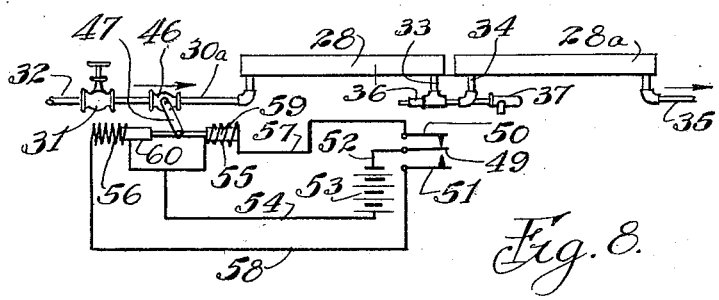

My invention will best be understood by reference to the accompanying drawings showing a preferred embodiment thereof, in which Fig. 1 is a vertical, longitudinal, sectional view through a heat treatment furnace provided with my improved conveying mechanism, Fig. 2 is a sectional view to an enlarged scale, of the parts shown in Fig. 1 taken along the line 2—2, Fig. 3 shows in plan view to a further enlarged scale, a part of a conveyor chain in place on its runway, Fig. 4 shows in side view to a further enlarged scale, one of the chain links shown in Fig. 3, Fig. 5 is a sectional view through the parts shown in Fig. 3 taken along the line 5—5, this view being to a larger scale than that shown in Fig. 3, Fig. 6 shows in a view similar to Fig. 1, a modified arrangement of piping for controlling the flow of cooling fluid through the sections of the chain runway, Fig. 7 shows in a view similar to Fig. 6 a further modified arrangement of piping for controlling the flow of cooling fluid through the sections of the chain runway, and Fig. 8 shows in a diagrammatic view, controlling mechanism that may be employed to regulate the flow of cooling fluid through the sections of the chain runway, according to the temperature of the cooling fluid in the runway sections.

Similar numerals refer to similar parts throughout the several views.

In Fig. 1 I show at 10 a heat treatment furnace of refractory material, which furnace may have any desired size and construction, according to the particular work it is to do. As illustrated, the furnace is provided with a stack 11, and a transverse metal beam 12 for holding the furnace blocks 10a in place. The furnace may be heated in any desired manner, for example by oil or gas burners 13, and an admission opening 14 and outlet opening 15 are provided respectively in the rear and the front walls of the furnace, to permit the parts and materials to be treated, to enter and leave the furnace. A plurality of endless conveyor chains 16, preferably of ferrous alloy having high heat resistant properties, extend in parallel relation through the furnace and are supported outside of the furnace on sprocket wheels 17, 18, 19 and 20, carried respectively by shafts 21, 22, 23 and 24 so that the chains may move continuously through the furnace and return below the bed 25 of the furnace as indicated.

The chains 16 may be of any particular type applicable to the purpose, and in Figs. 1 and 2, I illustrate chains having pads or platforms 16a carried by the links to provide substantially continuous supporting surfaces above the links in the furnace for the parts or materials carried through the furnace by the chains. The shafts 21, 22, 23 and 24 may be supported in suitable bearings not shown, in any desired manner, and one or more of the shafts may be provided with driving mechanism, as shown for example for the shaft 23, which carries a pinion 26 engaged by a chain 27 extending to any suitable source of motive power not shown.

Each of the chains 16 is supported in the furnace, by runway sections 28, 28a, the runway sections for each chain being supported by the bed of the furnace, in line with each other to constitute in effect a continuous support for the chain. The runway sections 28, 28a are made preferably of ferrous alloy having high heat resistant properties, and are hollow so that cooling medium may be caused to flow through them. The number of runway sections 28, 28a, used with each chain 16, is determined by the length of the furnace, since it is desirable that these runway sections shall be short enough to be conveniently made, and also short enough so that there is no danger of their warping under the action of the heat of the furnace. The runway sections 28, 28a for each chain are separated slightly at their adjacent ends as indicated, to permit expansion of the sections when they are subjected to the heat of the furnace, and the adjacent ends of each pair of runway sections for each chain, are preferably supported by a metal plate 29 resting on the furnace bed 25, to insure that the upper surfaces of the adjacent ends of the runway sections are maintained in alignment with each other. The runway sections 28, 28a for each chain 16, may be supplied with cooling fluid as follows: A pipe 30 extends from the entrance end of the section 28 through the bed 25 to a control valve 31, from which connection is made by a pipe 32 with the source of cooling fluid employed, which is maintained in any desired manner under requisite pressure to cause it to flow through the runway sections. The other end of the section 28 has connected with it a pipe 33 extending through the bed 25, this pipe 33 in turn connecting with a pipe 34 extending through the bed 25 and connecting with the end of the section 28a adjacent to the section 28. The other end of the section 28a has connected with it a pipe 35 extending through the bed 25 to discharge the cooling fluid as desired, after it has flowed through the runway sections for one of the chains 16.

The fittings connecting the pipes 33 and 34 below the bed 25 are preferably provided with thermostatic devices 36 for controlling the flow of cooling fluid through the runway sections, and also with a pressure relief valve 37 for preventing the development of excessive pressures in the runway sections, by the heat of the furnace. The plate 29 is preferably provided with enlarged openings through it for the pipes 33 and 34, to the end that the pipes may move freely towards and from each other as required by the contraction and expansion of the runway sections 28, 28a.

The piping described may be connected with the runways either by threading or welding as desired and as may be determined by the particular service to which the runways are to be subjected. The cooling fluid employed may be of any nature that will adequately absorb the required amount of heat from the runways and chains, to protect them from undesirable action of the heat in the furnace. For example, where the furnace temperatures are relatively low, the fluid may be gaseous, for example air; again, for higher furnace temperatures, it may be desirable to use liquid as the cooling fluid, for example oil of one kind or another; again, under other conditions of furnace temperature, water will be found to give effective results as a cooling fluid.

A supporting plate or plates 38 are preferably provided below each chain 16 to support the lower part of the chain, this plate or plates being supported in turn in any convenient manner.

As shown in Fig. 2 each of the runway sections is provided with upwardly extending edge flanges 28b, 28b forming a channel between them to receive the chain 16 so that the chain is supported and guided by the runway in its movement through the furnace. It will be understood that the number of chains and runways provided in any furnace, is determined by the size of the furnace, and the nature of the parts or materials to be treated. Where the material treated is in the form of relatively thin metal sheets, it is desirable to place the conveyor chains relatively near each other, to avoid sagging of the sheets when heated and to further avoid undue pressures at the points of support of the sheets which might result in black spots and surface cracks. In other cases, where the parts or materials to be treated are of a form making them comparatively rigid when heated, and where the parts are of a length permitting the use of a relatively narrow furnace, two chains, one at each side of the furnace will be found sufficient. In the latter case, particularly where the end portions of the parts being treated, do not require heat treatment, the top wall of the furnace is preferably provided with downwardly extending flange sections 10b which may be provided on their lower edges with pipes 39 to receive cooling medium, for example water. In this manner the end portions of the parts or materials being treated may be protected from the maximum temperatures in the furnace, and at the same time the chains and runways may be protected to a certain extent by said furnace flanges from said temperatures. The runways 28 may be provided with flanges 28c, to increase the anchorage of the runways in the bed 25.

The chain 16, may be of any form that will carry the parts or materials through the furnace, and in Fig. 3 I show a type of chain 16b which is the same as that illustrated in Figs. 1 and 2, excepting that the pad or platform sections 16a are omitted. In this construction, each link of the chain consists of a cylindrical pivot portion 16c and a hook portion 16d for engaging the cylindrical portion 16c of the next link, and an integral connecting frame 16e of a length permitting the teeth of the sprocket wheels to properly engage the chain. With chain links of this kind as heretofore constructed, the frame 16e is continued at its edges in the form of annular flanges 16f around the hook portion 16d, to reinforce said hook portion, and these annular flanges 16f have heretofore constituted the only bearing surfaces of the chain on the chain runways. As a result, particularly where heavy loads were carried by the chain, the unit pressures developed between the chain links and the runways, were high, and this, together with the highly heated condition of the chains and the runways, produced rapid wearing and disintegration both of the chain links and the runways, requiring frequent renewal of the runways because of their usually being of softer material than the chain links. This undesirable result, I avoid in part, by constructing the runways as described, so that they may be maintained in relatively cool condition by suitable cooling fluid, and I further avoid this undesirable result, by extending the frame portions 16e of each link towards the runway in the form of an enlarged bearing portion 16g, each of these bearing portions having a flat surface of engagement with the runway, and being of a length substantially equal to the distance between the cylindrical portions 16c of successive links, or as much of said distance as permitted in passing the chain around its sprocket wheels. Each of the bearing portions 16g is of the full width permitted by the clearance required by the sprocket teeth co-operating with the chain, and the overall width of the chain.

In this manner substantial bearing surfaces are provided for each chain link, and these bearing surfaces accomplish two results: First, the weight carried by any link of the chain in serving its purpose described, is distributed over a considerable area and the unit bearing pressures are correspondingly low with the result that wear of the chain links and wear of the chain runways is reduced to a minimum; second, the relatively large areas of contact between chain links and the runways permit the effective transfer of heat from the chain links to the runways, and in turn to the cooling fluid in the runways, with the result that the chain is maintained in much cooler condition than if the chain links were of the conventional form, even if the cooled runways were employed. The construction of the bearing portions 16g is more clearly shown in Figs. 4 and 5.

In the piping arrangement shown in Fig. 6, cooling fluid is supplied to the runway section 28 by pipe 30 as above described, and after passing through the runway section 28a, the cooling fluid is delivered to the discharge pipe 35 in the manner above described. In this case however, the pipes 33 and 34 are connected respectively with pipes 40 and 41 extending under the bed 25 towards the ends of the furnace, the other ends of these pipes 40 and 41 being connected with the ends of a pipe 42, so that the pipes 40, 41 and 42 serve to cool the fluid medium flowing from the runway section 28, before it is delivered to the runway section 28a. With this construction, thermostatic devices 36 and a pressure relief valve 37 are connected with the piping adjacent the ends of the pipe 42.

In cases where the furnace temperatures are very high, it may be desirable to supply cooling fluid from the source of such fluid, directly to each of the runway sections as illustrated in Fig. 7. As shown in this figure, cooling fluid is supplied to the runway section 28 through pipe 30 as above described, and after passing through the section 28, the cooling fluid is delivered therefrom to a pipe 43 extending to the discharge point of the cooling fluid. Thermostatic devices 36a and a pressure relief valve 37a are connected with the outlet pipe 43, to control the flow of cooling fluid through the section 28 and prevent the development of excessive pressure in said section. The runway section 28a is supplied with cooling fluid by a pipe 44 extending to the source of cooling fluid, and after passing through the section 28a, the fluid is delivered to pipe 45 by which it is discharged as desired. Thermostatic devices 36b and a pressure relief valve 37b are connected with pipe 45 to control the flow of cooling fluid through the section 28a and to prevent the producing of undesired pressures in said section.

In Fig. 8, I illustrate diagrammatically a control system that may be employed to regulate the flow of cooling fluid through the runway sections. As shown in this figure, the pipe 30a for supplying cooling fluid to any of the runway sections, for example the runway section 28, extends to an automatically operated valve 46 having an operating arm 47, said valve being connected through a stop valve 31 with the pipe 32 supplying the system with cooling fluid. The thermostatic devices 36 consist in part of a movable contact spring 49 arranged to make electric contact with either of two fixed contact springs 50 and 51 according to whether the cooling fluid in the pipe 33 is hotter or cooler than desired, the contact spring 49 being carried by an arm movable in one direction or the other according to increase or decrease in temperature. The contact spring 49 is connected by wire 52 with one terminal of a battery 53, or equivalent source of electric current, the other terminal of said source being connected by wire 54 with one terminal of each of the solenoids 55 and 56. The other terminal of the solenoid 55 is connected by wire 57 with the contact spring 50, and the other terminal of the solenoid 56 is connected by wire 58 with the contact spring 51. The solenoids 55 and 56 are provided with cores 59 and 60 which are connected together as indicated and also with the arm 47, so that energization of the solenoid 55 moves the arm 47 to open the valve 46, and energization of the solenoid 56 moves the arm 47 to close the valve 46. As a result of the circuit connections described, when the temperature of the cooling fluid delivered to the pipe 33 is hotter than a predetermined temperature, the contact spring 49 engages the contact spring 50 and energizes the solenoid 55 which opens the valve 46, if it is not already in its open position. When the contact spring 49 engages the contact spring 51, due to the temperature of the cooling fluid in the pipe 33 dropping below a second predetermined temperature, the solenoid 55 is deenergized and the solenoid 56 is energized to close the valve 46. It will be observed that the contacts 50 and 51 may be adjusted so that there are intermediate positions of the contact spring 49 for which neither of the solenoid circuits is closed, and if desired, the movement imparted to the arm 47 by the solenoids 55 and 56 may be limited so as to but partly close the valve 46 when the solenoid 56 is energized.

I find it important to automatically control the cooling fluid flowing through the runway sections, for while it is desirable to cool said sections to protect them and the chains from being overheated, it is at the same time important that this cooling action be not permitted to cool the runway sections and chains more than necessary to protect them from the heat of the furnace, otherwise much of the heat of the furnace would be unnecessarily lost. To render effective the automatic control described, the nature of the cooling fluid, its temperature, the size of the piping and the capacity for cooling fluid in the runway sections, should be taken so that for maximum pressure on the cooling fluid, a somewhat greater cooling effect is produced on the runway sections and the chains, than is required, to the end that the thermostatic devices may hold the degree of cooling of the runway sections and the chains at substantially the desired amount. It will be understood that each of the chain runways may be provided with controlling mechanism as illustrated in Fig. 8, or if preferred, the same control mechanism may control all of said chain runways, particularly where the runways are heated substantially equal amounts, and it is desirable to cool them substantially equal amounts.

While I have shown my invention in the particular embodiment above described, it will be understood that I do not limit myself to this exact construction as I may employ equivalents known to the art at the time of the filing of this application without departing from the scope of the appended claims.

What I claim is:

1. Conveyor means for heat treatment furnaces, consisting of the combination of metal chains extending through the furnace, metal runways supporting said chains and having lateral guides for said chains, each of said runways being hollow, means for passing cooling fluid through said runways, and sprocket wheels engaging said chains to move them through the furnace, each of said chains consisting of interengaged links for engagement with the teeth of said sprocket wheels provided for said chain, said links having side portions with flat bottom surfaces of engagement with said runways of widths substantially equal to the width between the said runway guides less the lateral clearances for said sprocket teeth, and of lengths substantially equal to the lengths between clearances of the interengaging portions of said links.

2. Conveyor means for heat treatment furnaces, consisting of the combination of metal chains extending through the furnace, metal runways supporting said chains and having lateral guides for said chains, and sprocket wheels engaging said chains to move them through the furnace, each of said chains consisting of interengaged links for engagement with the teeth of said sprocket wheels provided for said chain, said links having side portions with flat bottom surfaces of engagement with said runways of widths substantially equal to the width between the said runway guides less the lateral clearances for said sprocket teeth, and of lengths substantially equal to the lengths between clearances of the interengaging portions of said links.

3. Conveyor means for heat treatment furnaces, consisting of the combination of a metal runway having lateral guides, and a metal chain movable on said runway and consisting of interengaged links for engagement with the teeth of driving and directing sprocket wheels, said links having side portions with flat bottom surfaces of engagement with said runways of widths substantially equal to the width between the said runway guides less the lateral clearances for said sprocket teeth, and of lengths substantially equal to the lengths between clearances of the interengaging portions of said links.

4. A metal conveyor chain consisting of interengaged links for engagement with sprocket teeth, said links having side portions provided with flat bottom supporting surfaces of widths substantially equal to the over-all width of the chain less the lateral clearances for sprocket teeth, and of lengths substantially equal to the lengths between clearances of the interengaging portions of said links.

5. A metal conveyor chain consisting of rectangular links hooked together and provided with clearances permitting bending said chain and for engaging the teeth of driving and directing sprocket wheels, said links having side members extended to form flat bottom supporting surfaces of widths substantially equal to the over-all width of the chain less the lateral clearances for sprocket teeth, and of lengths substantially equal to the lengths between clearances of the interengaging portions of said links.

6. Conveyor means for heat treatment furnaces, consisting of the combination of metal chains extending through the furnace, metal runways supporting said chains, each of said runways being hollow, and means for passing cooling fluid through said runways, each of said runways including a plurality of separate cooling sections, said means including piping independently supplying said sections with cooling fluid.

7. Conveyor means for heat treatment furnaces, consisting of the combination of metal chains extending through the furnace, metal runways supporting said chains, each of said runways being hollow, means for passing cooling fluid through said runways, each of said runways consisting of a plurality of sections, said means including piping independently supplying said sections with cooling fluid, and thermostatic devices for independently controlling the flow of cooling fluid in said sections.

8. A metal runway for a conveyor chain and consisting of a plurality of longitudinally aligned sections, each of said sections being hollow to receive cooling fluid, and a metal plate supporting adjacent ends of two of said runway sections and maintaining said ends in alignment vertically.

9. A metal runway for a conveyor chain and consisting of a plurality of longitudinally aligned sections, each of said sections being hollow to receive cooling fluid, a metal plate supporting adjacent ends of two of said runway sections and maintaining said ends in alignment vertically, and pipes extending from the end portions of said runway sections to supply cooling fluid to and deliver the same from said runway sections, said plate having clearance openings therethrough receiving corresponding ones of said pipes and permitting contraction and expansion of the corresponding runway sections.

In witness whereof, I hereunto subscribe my name this 10th day of May, A. D. 1930.

EDSON O. SESSIONS.